United States Patent
Nammi et al.

(10) Patent No.: US 9,209,870 B1
(45) Date of Patent: Dec. 8, 2015

(54) ADAPTIVE WIRELESS MIMO COMMUNICATIONS SYSTEM USING LIST-BASED MIMO DETECTOR

(71) Applicant: Telefonaktiebolaget L M Ericsson (publ), Stockholm (SE)

(72) Inventors: Sairamesh Nammi, Kista (SE); Niklas Andgart, Södra Sandby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/566,785

(22) Filed: Dec. 11, 2014

(51) Int. Cl.
*H04B 7/04* (2006.01)
*H04B 1/38* (2015.01)
*H04B 7/06* (2006.01)

(52) U.S. Cl.
CPC .............. *H04B 7/0417* (2013.01); *H04B 1/38* (2013.01); *H04B 7/0632* (2013.01)

(58) Field of Classification Search
CPC ....... H04B 7/0417; H04B 1/38; H04B 7/0632
See application file for complete search history.

(56) References Cited

U.S. PATENT DOCUMENTS

| | | | |
|---|---|---|---|
| 2009/0080558 A1* | 3/2009 | An | H04L 1/0625 375/267 |
| 2011/0261898 A1* | 10/2011 | Huang | H04B 7/0434 375/295 |

OTHER PUBLICATIONS

Proakis, J. et al., "Digital Communications," McGraw-Hill Science/Engineering/Math, 5th Edition, Nov. 6, 2007, pp. 880-882.

* cited by examiner

*Primary Examiner* — Jaison Joseph
(74) *Attorney, Agent, or Firm* — Withrow & Terranova, PLLC

(57) ABSTRACT

Systems and methods for providing feedback in a Multiple-Input-Multiple-Output (MIMO) system are disclosed. In some embodiments, a method of operation of a receiving device in a MIMO system comprises determining an antenna correlation metric value indicative of a transmit and/or receive antenna correlation for a MIMO channel from a transmitting device of the MIMO system to the receiving device. The method further comprises obtaining a first value for a signal quality parameter for a MIMO receiver of the receiving device as if the MIMO receiver uses a first MIMO detector of a first MIMO detector type, computing a second value for the signal quality parameter for the MIMO receiver for a second MIMO detector of a second MIMO detector type actually used by the MIMO receiver based on the first value for the signal quality parameter and the antenna correlation metric value, and generating feedback based on the second value.

26 Claims, 14 Drawing Sheets

SCHEMATIC FUNCTION OF SNR OFFSET
AS FUNCTION OF ESTIMATED CORRELATION

US 9,209,870 B1

ADAPTIVE WIRELESS MIMO COMMUNICATIONS SYSTEM USING LIST-BASED MIMO DETECTOR

TECHNICAL FIELD

The present disclosure relates to an adaptive wireless Multiple-Input-Multiple-Output (MIMO) communications system.

BACKGROUND

Multiple-Input-Multiple-Output (MIMO) is an advanced antenna technique utilized in wireless systems (e.g., cellular communications networks) to improve spectral efficiency and thereby boost overall system capacity. For MIMO, a commonly known notation of ($N_T \times N_R$) is used to represent the MIMO configuration in terms the number of transmit antennas ($N_T$) and the number of receive antennas ($N_R$). Common MIMO configurations used or currently discussed for various technologies are: (2×1), (1×2), (2×2), (4×2), (8×2), (2×4), (4×4), (8×4), and (8×8). The MIMO configurations represented by (2×1) and (1×2) are special cases of MIMO, and they correspond to transmit diversity and receive diversity, respectively.

It is well known that MIMO techniques can significantly increase the data carrying capacity of wireless systems. For these reasons, MIMO is an integral part of the 3rd and 4th generation wireless systems. Future 5th generation systems will also employ MIMO systems, also called massive MIMO systems (e.g., hundreds of antennas at the transmitter side and/or the receiver side). Typically with a ($N_T \times N_R$) MIMO configuration, the peak data rate multiplies with a factor of $N_T$ over single antenna systems in a rich scattering environment.

FIG. 1 illustrates a MIMO transmitter 10 of a typical MIMO system with $N_T$ transmit antennas. In this example, there are $N_T$ transport blocks 12. However, in some cases, the number of transport blocks 12 can be less than $N_T$. Cyclic Redundancy Check (CRC) bits are added to each transport block 12, and the resulting transport blocks 12 including the CRC bits are passed to corresponding channel encoders 14. The channel encoders 14 add parity bits to protect the data. The resulting encoded data streams are passed through interleavers and modulators 16. An adaptive controller 18 adaptively controls the size of the interleavers by puncturing to increase the data rate. The adaptation is done by using information from a feedback channel received from the corresponding MIMO receiver (not shown) of the MIMO system. The information from the feedback channel may include, for example, Channel State Information (CSI) sent by the MIMO receiver. The interleaved data is passed through a symbol mapper, or modulator (not shown). The symbol mapper is also controlled by the adaptive controller 18. The modulated data streams are passed through a layer mapper 20 and a precoder 22. The resultant streams are then passed through Inverse Fast Fourier Transform (IFFT) blocks 24. Note that the IFFT blocks 24 are necessary for some communications systems that implement Orthogonal Frequency Division Multiple Access (OFDMA) as the access technology (e.g., Long Term Evolution (LTE)/LTE-Advanced (LTE-A), Wimax). For other communications systems that do not implement OFDMA (e.g., communications that implement CDMA as the access technology such as, e.g., High Speed Downlink Packet Access (HSDPA), etc.), the IFFT blocks 24 are replaced by spreading/scrambling blocks. Finally, the encoded streams are then transmitted through the respective antennas.

FIG. 2 illustrates a MIMO receiver 26 of a typical MIMO system with $N_R$ receive antennas. After Fast Fourier Transform (FFT) blocks 28 process the inputs from the $N_R$ receive antennas, a MIMO detector 30 is used to remove the multi antenna interference. De-mappers 32 are then used to compute the bit log likelihood ratios from the outputs of the MIMO detector 30, which are in the symbol domain. The bit streams are then de-interleaved by corresponding de-interleavers 34 and passed to channel decoders 36. CRC blocks 38 perform a CRC check on the output of the channel decoders 36. If the CRC is passed, the transport block is considered to be passed and an Acknowledgement (ACK) is sent back to the MIMO transmitter 10 via a feedback channel. If the CRC is failed, then a Negative Acknowledgement (NACK) is sent back to the MIMO transmitter 10 using the feedback channel. A channel estimator 40 operates to estimate the MIMO channel between the MIMO transmitter 10 and the MIMO receiver 26. The resulting channel estimate is utilized by the MIMO detector 30.

The MIMO detector 30 is needed to remove or reduce the inter-stream interference when spatial multiplexing is used. There are different types of MIMO detectors. Typically, MIMO detectors can be classified into two categories or types, namely, filter-based MIMO detectors which may be linear or non-linear (sometimes referred to herein as Type A MIMO detectors) and list-based MIMO detectors (sometimes referred to herein as Type B MIMO detectors).

Filter-based MIMO detectors (i.e., Type A MIMO detectors) include all MIMO detectors that utilize a filter-based technique. Some examples of filter-based MIMO detectors are: linear MIMO detectors such as, for example, Zero-Forcing (ZF) MIMO detectors and Minimum Mean Square Error (MMSE) MIMO detectors and non-linear MIMO detectors such as, for example, decision feedback MIMO detectors, nulling-cancelling MIMO detectors, and variants relying on Successive Interference Cancellation (SIC). Conversely, list-based MIMO detectors (i.e., Type B MIMO detectors) include all MIMO detectors that utilize a list-based technique. Some examples of list-based MIMO detectors are: Maximum Likelihood (ML) MIMO detectors, Maximum A Posteriori Probability (MAP) MIMO detectors, and reduced list size MIMO detectors such as, for example, sphere decoding MIMO detectors, list sphere decoding MIMO detectors, and variants relying on reduced list size ML or MAP MIMO detectors.

It is well known that Type B MIMO detectors (e.g., ML MIMO detectors) have better performance than Type A MIMO detectors (e.g., MMSE MIMO detectors) for fixed modulation and transport block size (code rate) (see, for example, J. Proakis et al., "Digital Communications," 5$^{th}$ edition, McGraw-Hill Science/Engineering/Math, Nov. 6, 2007). However, in wireless communications systems using adaptive rank, precoding index, modulation, and code rate, Type B MIMO detectors typically do not have better performance than Type A MIMO detectors. As such, Type A MIMO detectors, rather than Type B MIMO detectors, are commonly used in wireless communications systems.

In particular, in a wireless communications system, the performance is impacted by channel variations. For MIMO receivers employing a MMSE MIMO detector (i.e., a MMSE receiver), this performance loss can be minimized by using adaptive rank, precoding index, modulation, and code rate. This adaptation is based on feedback of Channel Quality Indicator (CQI) from the MIMO receiver to the MIMO transmitter. Computation of CQI for Type A MIMO receivers is performed using well-known mathematical expressions. However, no such expressions are known for computing CQI for a Type B MIMO receiver. As such, Type B MIMO receivers are not currently used in wireless communications systems in which adaptive rank, precoding index, modulation, and code rate are desired. In other words, because there is no known expression for computing CQI for a Type B MIMO receiver, a wireless MIMO communications system using Type B MIMO receivers is not able to use adaptive rank, precoding index, modulation, and code rate and, as a result, performance of a wireless MIMO communications system using a Type B MIMO receiver is less than desirable.

Therefore, there is a need for systems and methods for improving the performance (e.g., throughput) of a wireless MIMO communications system using a MIMO receiver employing a Type B (i.e., list-based) MIMO detector.

SUMMARY

Systems and methods relating to feedback in a Multiple-Input-Multiple-Output (MIMO) system are disclosed. Embodiments of a method of operation of a receiving device in a MIMO system to provide feedback from the receiving device to a transmitting device in the MIMO system to enable adaptive transmission are disclosed. In some embodiments, the method of operation of the receiving device comprises determining an antenna correlation metric value indicative of a transmit antenna correlation for a MIMO channel from the transmitting device to the receiving device and/or a receive antenna correlation for the MIMO channel. The method further comprises obtaining a first value for a signal quality parameter for a MIMO receiver of the receiving device as if the MIMO receiver uses a first MIMO detector of a first MIMO detector type. The method further comprises computing a second value for the signal quality parameter for the MIMO receiver of the receiving device for a second MIMO detector of a second MIMO detector type actually used by the MIMO receiver based on the first value for the signal quality parameter for the first MIMO detector of the first MIMO detector type and the antenna correlation metric value. The method further comprises generating feedback based on the second value for the signal quality parameter for the second MIMO detector of the second MIMO detector type and providing the feedback to the transmitting device. In this manner, feedback for the MIMO receiver using the second MIMO detector of the second MIMO detector type can be generated and provided even though, in some embodiments, mathematical expressions for the signal quality parameter for the second MIMO detector of the second MIMO detector type are unavailable.

In some embodiments, the first MIMO detector type is a filter MIMO detector type, and the second MIMO detector type is a list MIMO detector type. Further, in some embodiments, the first MIMO detector is one of a group consisting of: a Zero-Forcing (ZF) MIMO detector; a Minimum Mean Square Error (MMSE) MIMO detector; a decision feedback MIMO detector; a nulling-cancelling MIMO detector; and a MIMO detector based on Successive Interference Cancellation (SIC); and the second MIMO detector is one of a group consisting of: a Maximum Likelihood (ML) MIMO detector; a Maximum A Posteriori Probability (MAP) MIMO detector; a sphere decoding MIMO detector; a list sphere decoding MIMO detector; a reduced list size ML MIMO detector, and a reduced list size MAP MIMO detector. In one particular embodiment, the first MIMO detector is a MMSE MIMO detector, and the second MIMO detector is a ML MIMO detector.

In some embodiments, the method of operation of the receiving device further comprises receiving one or more downlink parameter values from the transmitting device in response to providing the feedback to the transmitting device, and detecting downlink data transmitted from the transmitting device to the receiving device via the second MIMO detector of the second MIMO detector type using the one or more downlink parameter values.

In some embodiments, the signal quality parameter is one of a group consisting of: Signal-to-Interference-plus-Noise Ratio (SINR) and Signal-to-Noise Ratio (SNR).

In some embodiments, the feedback comprises at least one of a group consisting of: a Channel Quality Indictor (CQI); a Precoding Matrix Indicator (PMI); and a transmission rank.

In some embodiments, determining the antenna correlation metric value comprises estimating a MIMO channel from the transmitting device to the receiving device to thereby provide a channel estimate, computing a correlation matrix for the MIMO channel from the channel estimate, and computing the antenna correlation metric value based on the correlation matrix. Further, in some embodiments, obtaining the first value for the signal quality parameter comprises computing a SINR or SNR value as if the MIMO receiver of the receiving device uses the first MIMO detector of the first MIMO detector type, and computing the second value for the signal quality parameter comprises computing a SINR or SNR value for the MIMO receiver for the second MIMO detector of the second MIMO detector type actually used by the MIMO receiver as a sum of the SINR or SNR value obtained for the MIMO receiver as if the MIMO receiver uses the first MIMO detector of the first MIMO detector type and an offset value corresponding to the antenna correlation metric value.

In some embodiments, the offset value is a predetermined offset value for the antenna correlation metric value. Further, in some embodiments, there are a plurality of predetermined offset values for a plurality of antenna correlation metric values, respectively, and the predetermined offset value for the antenna correlation metric value is the one of the plurality of predetermined offset values that corresponds to the antenna correlation metric value.

In some embodiments, the offset value is a predefined function of the antenna correlation metric value.

In some embodiments, the offset value is dynamically updated by the receiving device.

Embodiments of a receiving device in a MIMO system that is enabled to provide feedback to a transmitting device in the MIMO system are also disclosed.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present disclosure relates to a wireless Multiple-Input-Multiple-Output (MIMO) communications system including a transmitting device and a receiving device, where the receiving device includes a list-type (Type B) MIMO receiver (i.e., a MIMO receiver employing a list-type, or Type B, MIMO detector). Feedback from the receiving device is generated based on a signal quality parameter value (e.g., a Signal-to-Interference-plus-Noise Ratio (SINR) or Signal-to-Noise Ratio (SNR) value) obtained (e.g., computed) by the receiving device for, or assuming, a filter-type (Type A) MIMO detector and an antenna correlation metric value that is indicative of transmit and/or receive antenna correlation for the MIMO channel. For instance, in some embodiments, an offset is determined for the antenna correlation metric value for the MIMO channel (e.g., predefined in a Look-Up Table (LUT) or computed as a predefined function of the antenna correlation metric value). This offset is then applied to the signal quality parameter value for the Type A MIMO detector to thereby provide a signal quality parameter value for the Type B MIMO detector (i.e., a signal quality parameter value for the Type B MIMO receiver). Feedback (e.g., Channel State Information (CSI)) is then generated based on the signal quality parameter value for the Type B MIMO receiver and reported to the transmitting device in the MIMO communications system. In this manner, performance of the Type B MIMO receiver is substantially improved as compared to conventional Type B MIMO receivers, which are unable to employ adaptive feedback techniques due to the unavailability of known mathematical expressions to compute the signal quality parameter value (e.g., SINR or SNR).

Figure 3:
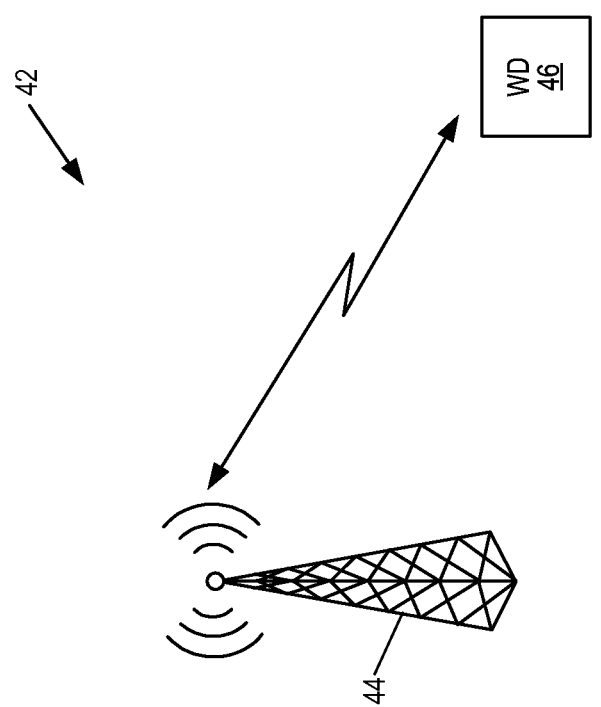
FIG. 3 illustrates one example of a wireless MIMO communications system in which embodiments of the present disclosure can be implemented.

In this regard, FIG. 3 illustrates one example of a wireless MIMO communications system. In this example, the wireless MIMO communications system is a cellular network 42 including a base station 44 and a wireless device 46. The cellular network 42 may be, for example, a $3^{rd}$ Generation Partnership Project (3GPP) Long Term Evolution (LTE) or LTE-Advanced (LTE-A) network. Further, the cellular network 42 may be a 4th, 5th, or future generation cellular network. In 3GPP terminology, the base station 44 may be referred to as an enhanced or evolved Node B (eNB). Note that while the base station 44 is used in the examples described herein, the functionality described herein may be implemented with a radio access node (i.e., any network node in the radio access network). The wireless device 46 may be, in 3GPP terminology, a User Equipment (UE). However, the wireless device 46 is not limited thereto. In particular, the wireless device 46 may be any type of wireless device 46 capable of communicating or accessing the cellular network 42 (e.g., a machine type communication device, a dongle or similar device that provides access to the cellular network 42 for some other device, or the like).

Note that while the discussion below focuses on embodiments in which the MIMO system includes the base station 44 as the transmitting device and the wireless device 46 as the receiving device, the present disclosure is not limited thereto. The embodiments are more generally applicable to any transmitting device and any receiving device in any wireless MIMO communications system. Further, with respect to the cellular network 42, while the embodiments described herein focus on the downlink, the present disclosure is equally applicable to the uplink. Further, while some examples given herein consider a 2×2 MIMO system, the present disclosure is equally applicable to any $N_T \times N_R$ MIMO system (e.g., 4×2, 8×2, etc.).

Figure 1:
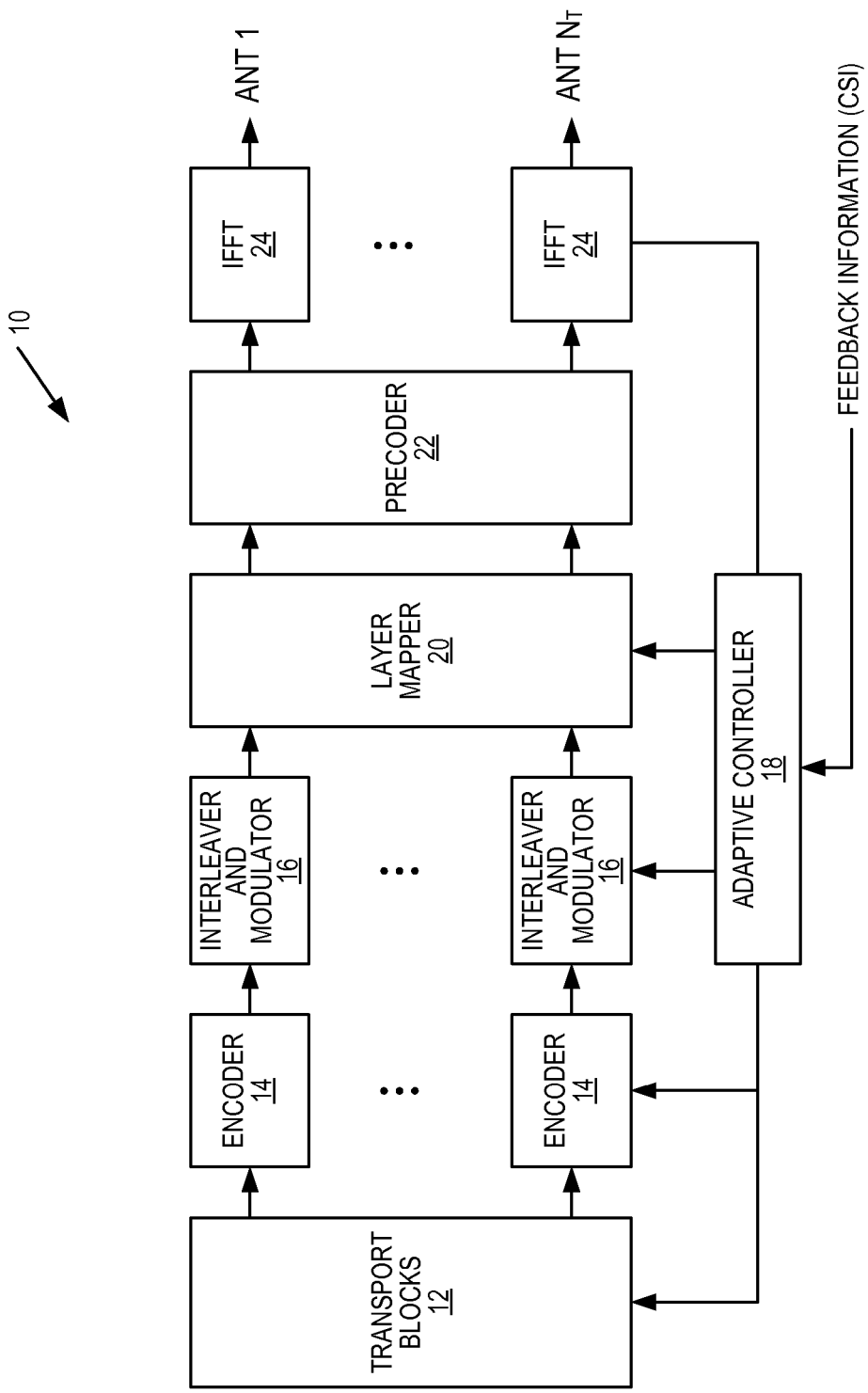
FIG. 1 illustrates a Multiple-Input-Multiple-Output (MIMO) transmitter of a typical MIMO system.
Figure 2:
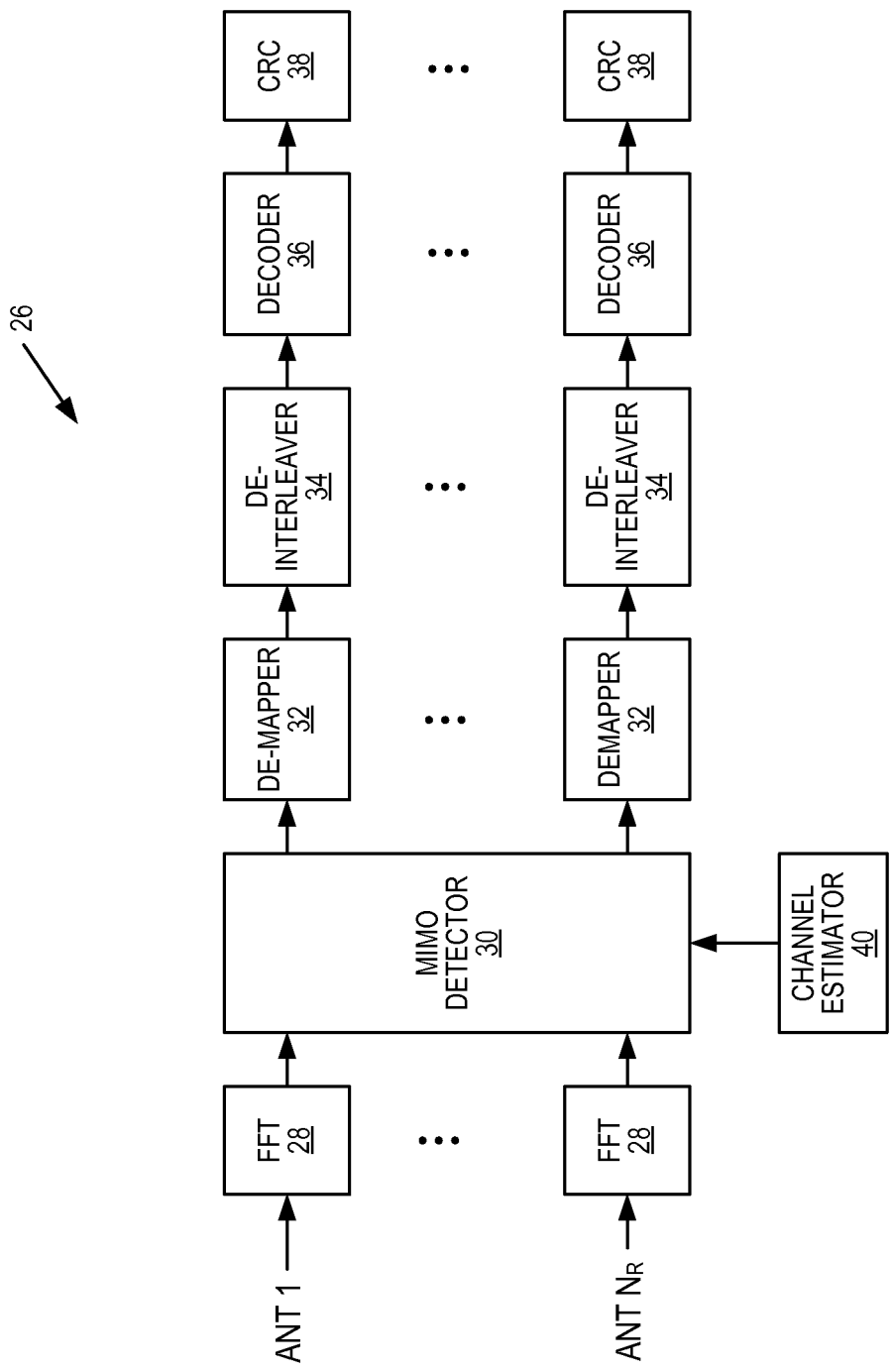
FIG. 2 illustrates a MIMO receiver of a typical MIMO system.
Figure 4:
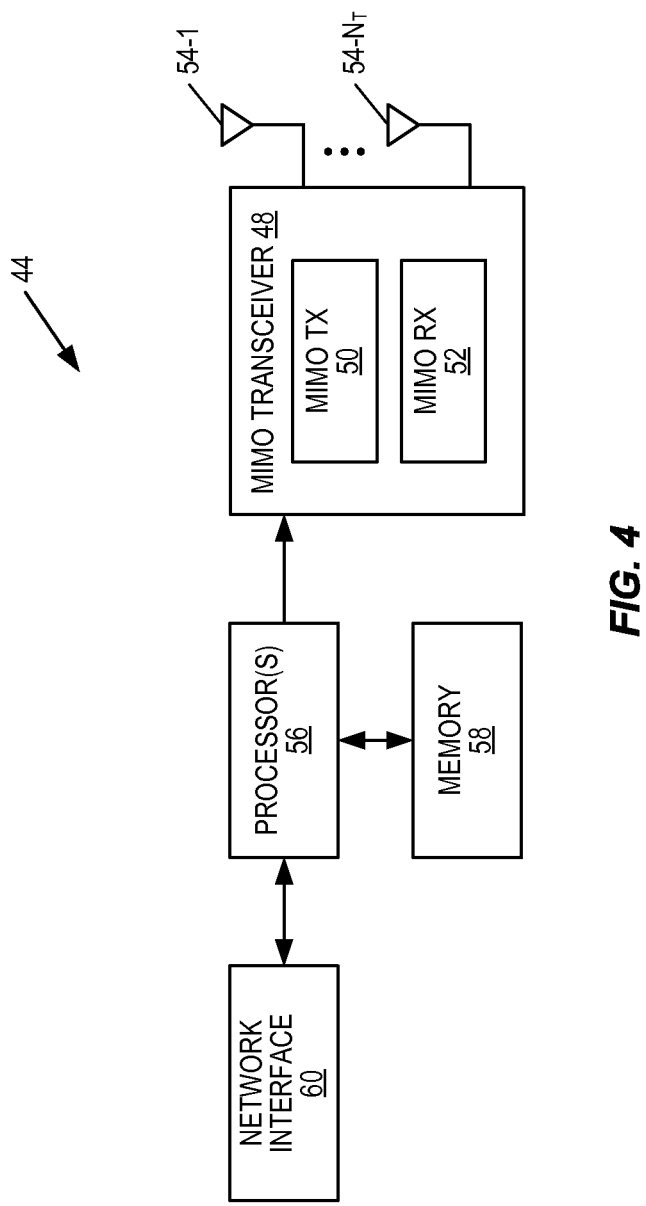
FIG. 4 illustrates one embodiment of the base station of FIG. 3.

As illustrated in FIG. 4, the base station 44 includes a MIMO transceiver 48 including a MIMO Transmitter (TX) 50 and a MIMO Receiver (RX) 52 coupled to a number of antennas 54-1 through 54-$N_T$. In the examples described herein, the base station 44 is the transmitting device in the MIMO system and, as such, the antennas 54-1 through 54-$N_T$ are also referred to herein as transmit antennas, where $N_T$ is the number of transmit antennas in the MIMO system. The MIMO transmitter 50 may be any suitable type of MIMO transmitter. For example, the MIMO transmitter 50 may be the typical MIMO transmitter 10 illustrated in FIG. 1. Similarly, the MIMO receiver 52 may be any suitable type of MIMO receiver. For example, the MIMO receiver 52 may be the typical MIMO receiver 26 illustrated in FIG. 2. As also illustrated, the base station 44 includes other components such as, for example, one or more processors 56 (e.g., one or more Central Processing Units (CPUs), one or more Application Specific Integrated Circuits (ASICs), and/or one or more Field Programmable Gate Arrays (FPGAs)), memory 58, and a network interface 60 (e.g., an interface that enables communication with other network nodes).

Figure 5:
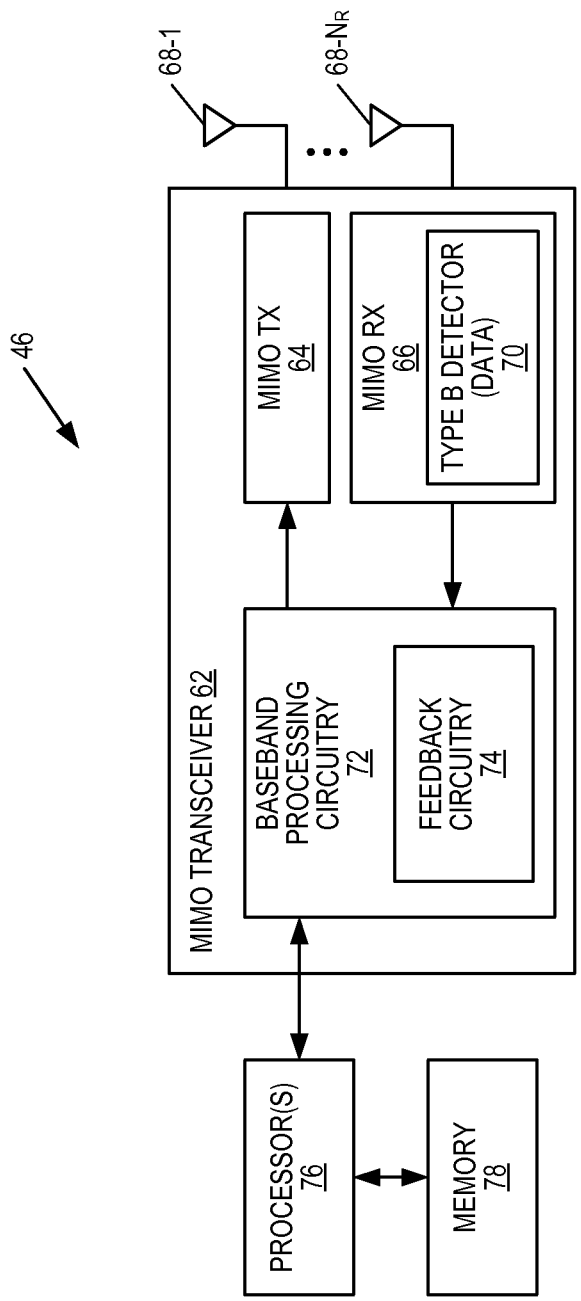
FIG. 5 illustrates one embodiment of the wireless device of FIG. 3.

As illustrated in FIG. 5, the wireless device 46 includes a MIMO transceiver 62 including a MIMO transmitter 64 and a MIMO receiver 66 coupled to a number of antennas 68-1 through 68-$N_R$. In the examples described herein, the wireless device 46 is the receiving device in the MIMO system and, as such, the antennas 68-1 through 68-$N_R$ are also referred to herein as receive antennas, where $N_R$ is the number of receive antennas in the MIMO system. Thus, the MIMO system formed by the base station 44 as the transmitting device and the wireless device 46 as the receiving device is a $N_T \times N_R$ MIMO system. The MIMO transmitter 64 may be any suitable type of MIMO transmitter. For example, the MIMO transmitter 64 may be the typical MIMO transmitter 10 illustrated in FIG. 1. However, the MIMO receiver 66 includes a Type B (i.e., list-type) MIMO detector 70. As such, the MIMO receiver 66 is also referred to herein as a Type B or list-type MIMO receiver 66. Otherwise, the MIMO receiver 66 may utilize any suitable MIMO receiver architecture such as, for example, the MIMO receiver 26 architecture of FIG. 2. In some embodiments, the Type B MIMO detector 70 is either a Maximum Likelihood (ML) MIMO detector or a Maximum A Posteriori Probability (MAP) MIMO detector.

In this embodiment, the MIMO transceiver 62 includes baseband processing circuitry 72, which includes feedback circuitry 74. While being illustrated as part of the MIMO transceiver 62, the baseband processing circuitry 72, and in particular the feedback circuitry 74, may be implemented external to the MIMO transceiver 62 or as part of either the MIMO receiver 66 or the MIMO transmitter 64. The baseband processing circuitry 72, and in particular the feedback circuitry 74, is implemented in hardware or a combination of hardware and software (e.g., one or more processors (e.g., one or more ASICs and/or one or more FPGAs) that execute software or instructions).

As discussed below in detail, the feedback circuitry 74 operates to generate feedback for the MIMO system that is utilized by the base station 44 (i.e., the transmitting device) to adaptively configure values for one or more transmit parameters for the downlink from the base station 44 to the wireless device 46. For example, the transmit parameters may include rank, Precoding Matrix Indicator (PMI), modulation, and/or code rate. In order to generate the feedback, the feedback circuitry 74 obtains (e.g., computes) a value for a signal quality parameter (e.g., a SINR or SNR value) for, or assuming, a filter-type (Type A) MIMO detector (e.g., a Minimum Mean Square Error (MMSE) MIMO detector), rather than a Type B MIMO detector (e.g., a ML or MAP MIMO detector). The feedback circuitry 74 then computes a value for the signal quality parameter for the Type B MIMO detector 70 based on the value for the signal quality parameter obtained for, or assuming, a Type A MIMO detector and an antenna correlation metric value that is indicative of transmit and/or receive antenna correlation for the MIMO channel. For instance, in some embodiments, an offset is determined for the antenna correlation metric value for the MIMO channel (e.g., predefined in a LUT or computed as a predefined function of the antenna correlation metric value). This offset is then applied to the value for the signal quality parameter value for the Type A MIMO detector to thereby provide the value for the signal quality parameter for the Type B MIMO detector 70. In this manner, the value for the signal quality parameter can be obtained for the Type B MIMO receiver 66 even though a mathematical expression for the signal quality parameter for the Type B MIMO receiver 66 may not be known (or, if known, the mathematical expression may have high complexity).

The feedback circuitry 74 then generates feedback (e.g., CSI) based on the value for the signal quality parameter computed for the Type B MIMO detector 70. The feedback may be generated from the value based on the value for the signal quality parameter computed for the Type B MIMO detector 70 using any suitable technique (e.g., a conventional process for computing CSI based on SINR or SNR). The feedback is then sent to the base station 44 (i.e., the transmitting device) via the MIMO transmitter 64 on, e.g., a feedback channel. In this manner, the base station 44 is then able to adaptively configure values for one or more transmit parameters to improve performance of the Type B MIMO receiver 66, and thus improve the performance of the MIMO system, in the presence of variations in the MIMO channel.

As illustrated, the wireless device 46 may include additional components. In particular, the wireless device 46 may include one or more processors 76 (e.g., one or more CPUs, one or more ASICs, and/or one or more FPGAs) and memory 78. Note that, in some alternative embodiments, some or all of the functionality described herein with respect to the feedback circuitry 74 may be implemented in software stored in the memory 78 and executed by the processor(s) 76.

Figure 6:
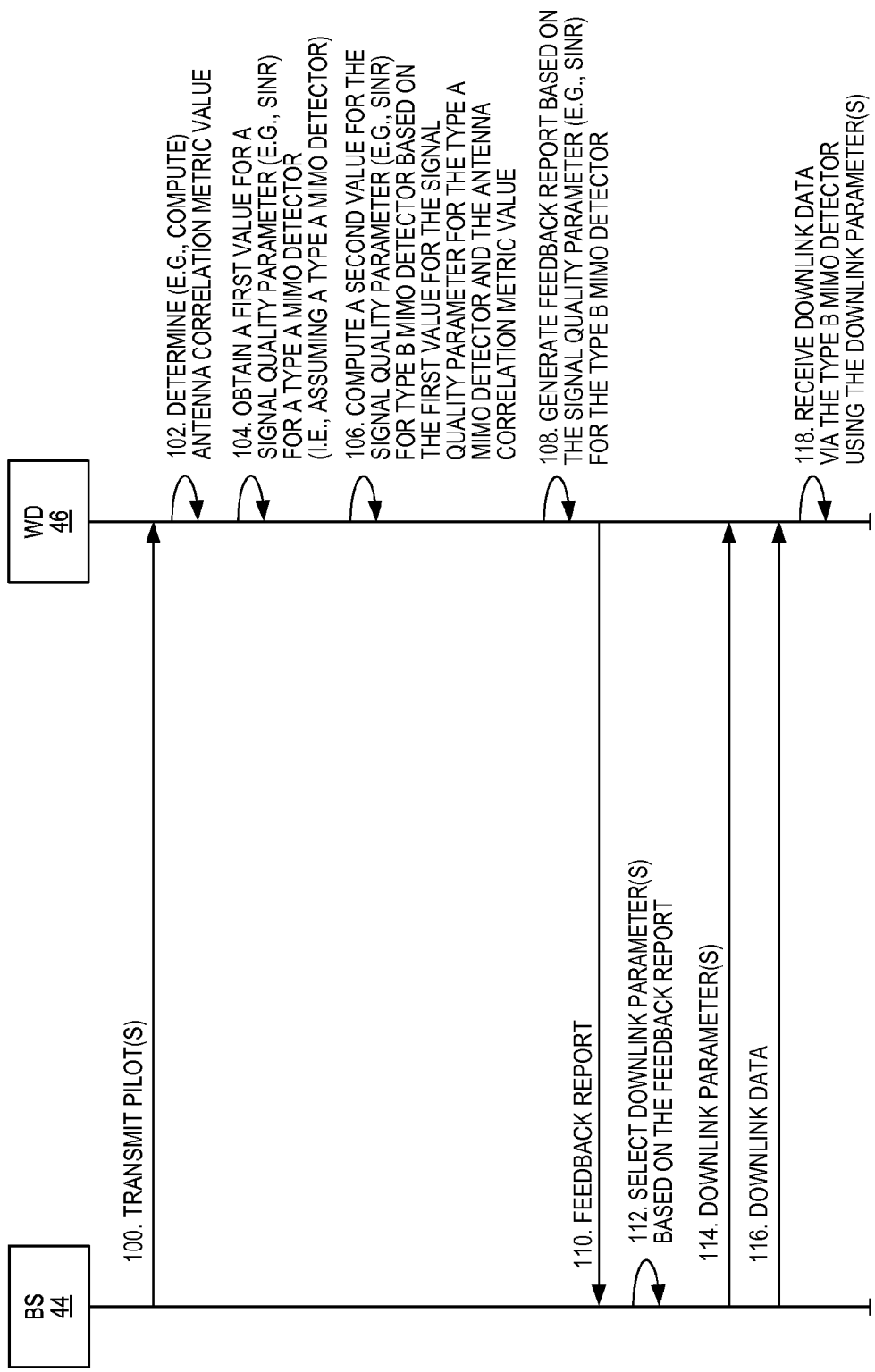
FIG. 6 illustrates the operation of the base station and the wireless device of FIG. 3 according to some embodiments of the present disclosure.

FIG. 6 illustrates the operation of the base station 44 and the wireless device 46 according to some embodiments of the present disclosure. As illustrated, the base station 44 transmits one or more pilot, or reference, signals (step 100). Using the pilot signal(s), the wireless device 46 computes a value for an antenna correlation metric (i.e., an antenna correlation metric value) that is indicative of transmit and/or receive antenna correlation for the MIMO system (step 102). The details of how the antenna correlation metric value is computed are provided below. In general, the wireless device 46 computes a channel estimate(s) for the MIMO channel from the base station 44 to the wireless device 46 using any suitable MIMO channel estimation technique. The wireless device 46 then computes a correlation matrix based on the channel estimate(s). From the correlation matrix, the wireless device 46 then computes the antenna correlation metric value.

In addition, the wireless device 46, and in particular the feedback circuitry 74, obtains (e.g., computes) a first value for a signal quality parameter (e.g., SINR or SNR) for a Type A MIMO detector (step 104). More specifically, even though the MIMO receiver 66 employs the Type B MIMO detector 70, the feedback circuitry 74 computes the first value for the signal quality parameter as if, or assuming, the MIMO receiver 66 employs a Type A MIMO detector. In some embodiments, a MMSE MIMO detector is assumed. For a Type A MIMO detector (e.g., a MMSE MIMO detector), mathematical expressions for computing, e.g., SINR or SNR are well-known. For example, for a MMSE MIMO detector, the SNR may be estimated for a first transmission layer (i.e., layer 0) (where the number of transmission layers is referred to as rank) as:

$$S = R + HH^H - h_0 h_0^H \quad (1)$$

$$SNR_{layer\,0} = h_0^H S^{-1} h_0 \quad (2)$$

where S represents the received signal at the $N_R$ receive antennas, R is an estimated noise and interference autocorrelation matrix, H is an effective channel matrix that typically includes both the channel estimate and a predefined precoder, and $h_0$ is a vector that denotes the first column of the effective channel matrix H. For simplicity, interference from other cells is treated as white noise. This same process is repeated for all transmission layers. For example, for the second transmission layer (layer 1), the SNR is computed as:

$$SNR_{layer\,1} = h_1^H S^{-1} h_1 \quad (3)$$

where $h_1$ is a vector that denotes the second column of the effective channel matrix H. Also, note that by computing different SNR values for different precoders, the wireless device 46 is able to report an index of the preferred precoder as well.

The wireless device 46 computes a second value for the signal quality parameter for the Type B MIMO detector 70 based on the first value for the signal quality parameter obtained for (i.e., assuming) the Type A MIMO detector and the antenna correlation metric value (step 106). The manner in which the second value for the signal quality metric is computed varies depending on the particular embodiment. As a non-limiting example, in some embodiments, the wireless device 46, and in particular the feedback circuitry 74, computes the second value for the signal quality metric for the Type B MIMO detector 70 by applying an offset to the first value of the signal quality parameter obtained for the Type A MIMO detector. For instance, offset values for multiple different antenna correlation metric values may be predefined (e.g., via simulation). These offset values may be stored in, e.g., a LUT. The antenna correlation metric value determined in step 102 can then be used to look up the appropriate offset value to be applied to the first value of the signal quality parameter to provide the second value of the signal quality parameter.

The wireless device 46, and in particular the feedback circuitry 74, then generates feedback (e.g., a feedback report) for the Type B MIMO receiver 66 based on the second value for the signal quality parameter computed in step 106 for the Type B MIMO detector 70 (step 108). Any suitable technique for computing the feedback may be used. For example, for 3GPP LTE, the feedback is a CSI report including, for example, a Channel Quality Indictor (CQI), a PMI, and Rank Information (RI). While not being limited to any particular feedback or any particular process for generating the feedback, in one example, the feedback includes a CQI value, and the signal quality parameter is SNR. In this example, the CQI value is generated by first translating the value computed for the SNR for the Type B MIMO detector 70 into Mutual Information (MI). The translation of the SNR into MI can be done by, for example, a predefined lookup table, predefined polynomials, or predefined ratios of polynomials, as will be appreciated by one of ordinary skill in the art upon reading this disclosure. One reason to translate the SNR into MI is that, contrary to SNR which is a non-linear measurement, MI is a linear measurement, which can be added together for different estimates. The MI is then translated into efficiency, where the efficiency is similar to the MI but takes into account practical limitations of the decoder leading to non-optimal decoding performance. Note that rather than first translating SNR to MI and then translating MI into efficiency, SNR may alternatively be translated directly to efficiency. A CQI value is then selected from a table of possible modulation orders and code rates such that, when using the selected CQI value, the resulting Block Error Rate (BLER) is approximately, e.g., 10%.

The wireless device 46 then transmits the feedback report to the base station 44 (step 110). In some embodiments, the feedback report is transmitted via a feedback or control channel. The base station 44 then selects values for one or more downlink, or transmission, parameters based on the feedback report (step 112). For example, in some embodiments, the feedback report includes a CQI value, a PMI value, and RI. Based on this feedback, the base station 44 selects values for, e.g., a rank, PMI, modulation, and/or code rate for downlink transmissions to the wireless device 46. The base station 44 then transmits the values for the downlink parameters to the wireless device 46 (step 114). The base station 44 also transmits downlink data to the wireless device 46 using the selected values for the downlink parameter(s) (step 116). The wireless device 46, and in particular the Type B MIMO receiver 66, then receives the downlink data according to the selected value(s) for the downlink parameter(s) (step 118).

Figure 7:
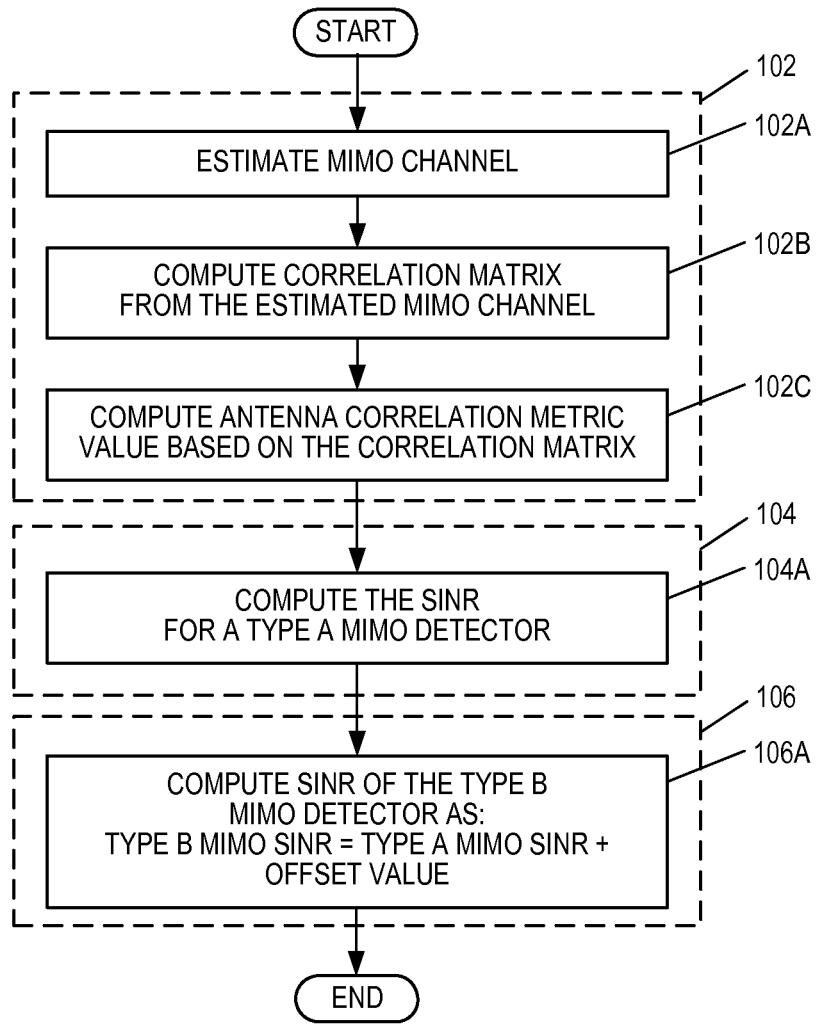
FIG. 7 is a flow chart that illustrates some steps of FIG. 6 in more detail according to some embodiments of the present disclosure.

FIG. 7 is a flow chart that illustrates steps 102, 104, and 106 of FIG. 6 in more detail according to some embodiments of the present disclosure. This process is, in some embodiments, performed by the feedback circuitry 74. As illustrated, in order to compute the antenna correlation metric value, the wireless device 46 estimates the MIMO channel (step 102A). In some embodiments, the MIMO channel is estimated based on the pilot signal(s) using a channel sounding procedure, as will be understood by one of ordinary skill in the art. However, any MIMO channel estimation process may be used. A correlation matrix is then computed from the estimated MIMO channel (step 102B). While the correlation matrix may be computed using any suitable technique, some examples are provided below.

Using a MIMO-Orthogonal Frequency Division Multiplexing (OFDM) system (e.g., LTE) as an example, let $H_i$ be the computed channel matrix for the $i^{th}$ OFDM subcarrier, and let $N_c$ denote the total number of carriers in the MIMO-OFDM system. Then, in some embodiments, the correlation matrix $R_H$ is computed as $$R_H = \frac{1}{N_C}\sum_{i=1}^{N_C} Vec(H_i)Vec(H_i)^H \tag{4}$$

where $Vec(H_i)$ is a column vector provided by stacking up all the columns of $H_i$. For example, if $H_i=[2\ 3;4\ 5]$ is the channel matrix, then $Vec(H_i)$ is given by $[2\ 3\ 4\ 5]^T$ where $[X]^T$ is the transpose of X. Also $[X]^H$ is the Hermitian operation of the vector X.

In other embodiments, the correlation matrix can be computed based on M realizations as means, where it is averaged over M time intervals as:

$$R_H = \frac{1}{MN_C}\sum_{j=1}^{M}\frac{1}{N_C}\sum_{i=1}^{N_C} Vec(H_i)Vec(H_i)^H \tag{5}$$

M can represent time intervals, and could also represent different pilots over one of several resource blocks over which the correlation is averaged.

In other embodiments, the correlation matrix is computed using the channel matrix $H_i$ rather than the stacked column vector $Vec(H_i)$. This will limit complexity. Also, not all cross-terms will be captured in the correlation, but important properties of the antenna correlation will be able to be detected. In particular, the correlation matrix can be computed as:

$$R_H = \frac{1}{N_C}\sum_{i=1}^{N_C} H_i H_i^H \tag{6}$$

Note that the wireless device 46 may report a CQI value for either wideband (i.e., for the whole bandwidth) or over several sub-bands. In either case, the calculations are based on several pilot positions, with channel and noise estimates. Also, as noted above, the correlation matrix may be computed over M pilot positions, where this range corresponds to the whole band or a sub-band. The correlation coefficient is then calculated and then applied to all estimated SNR values in the whole applicable region. After that, the individual adjusted SNR values may be converted to MI, and the resulting total MI can be calculated.

The method described above will estimate channel correlation on a subframe basis. In alternative embodiments, the correlation properties of the channel are estimated over a longer time scale, meaning that the M averaging size includes not only the pilots for which the SNR should be reported, but also information about historic correlation properties.

A method in an alternative embodiment is to average the estimated correlation coefficients or other classification of channel correlation over a longer time period, instead as above do it coherently for all elements of the correlation matrices. More specifically, in some embodiments described above, several resource blocks of pilots are used for estimation of the correlation coefficients. The estimated correlation coefficients (where these may come from one or several subframes) may be averaged over several correlation values. That is, no coherent sums are taken over large times. Instead, only average coefficients are used, for example, with Finite Impulse Response (FIR) or Infinite Impulse Response (IIR) filters. The "other classification" of channel correlation mentioned above could be, for example, a state machine that has one or more states, e.g., a "low-correlation channel" versus a "high correlation channel," and the transition between the states could be done when a filtered correlation value passes certain thresholds.

After computing the correlation matrix, the wireless device 46 computes a value for a correlation metric ($C_m$) indicative of transmit antenna correlation and/or receive antenna correlation based on the correlation matrix (step 102C). More specifically, once the correlation matrix is computed, the value of the correlation metric ($C_m$) is computed from the elements of the correlation matrix. Note that the non-diagonal elements of the correlation matrix represent the correlation (i.e., the transmitter and the receiver) values between the antennas. For example for a 2×2 MIMO system, assume that the antenna correlation at the transmitter side (i.e., the transmit antenna correlation) is 0.3, and the antenna correlation at the receiver side (i.e., the receive antenna correlation) is equal to 0. Then, the ideal correlation matrix is of the form $$R_H = \begin{bmatrix} 1.0 & 0.0 & 0.3 & 0.0 \\ 0.0 & 1.0 & 0.0 & 0.3 \\ 0.3 & 0.0 & 1.0 & 0.0 \\ 0.0 & 0.3 & 0.0 & 1.0 \end{bmatrix} \quad (7)$$

In these cases, the value of the correlation metric ($C_m$) can be taken as 0.3. However, in general, when estimating the correlation matrix, the correlation matrix is often of the form where the elements are not symmetrical. For example, if the estimated correlated matrix is of the form $$R_H = \begin{bmatrix} 0.9963 & 0.0031 & 0.299 & 0.0001 \\ 0.0031 & 1.024 & 0.0002 & 0.3015 \\ 0.2999 & 0.0002 & 1.0010 & 0.0004 \\ 0.0001 & 0.3015 & 0.0004 & 0.998 \end{bmatrix}, \quad (8)$$

then the correlation metric ($C_m$) can be computed as:

$$C_m = \frac{\text{mean}(\text{nondiag}(R_H))}{\text{mean}(\text{diag}(R_H))} \quad (9)$$

where mean (X) is the average of the elements of X, nondiag (X) is the non-diagonal elements of the matrix X, and diag(X) is the diagonal elements of the matrix X.

In other embodiments, only the maximum value of the non-diagonal elements can be taken in the correlation metric computation, i.e., $$C_m = \frac{\max(\text{nondiag}(R_H))}{\text{mean}(\text{diag}(R_H))} \quad (10)$$

In other embodiments, only the minimum value of the non-diagonal elements is used in effective correlation metric computation, i.e., $$C_m = \frac{\min(\text{nondiag}(R_H))}{\text{mean}(\text{diag}(R_H))} \quad (11)$$

Note that in all of the embodiments above for computing the correlation metric ($C_m$), the correlation metric ($C_m$) should be normalized by the mean of diagonal element.

In the embodiments above, the correlation metric ($C_m$) is indicative of transmit antenna correlation and receive antenna correlation. However, in other embodiments, the correlation metric ($C_m$) is computed such that it is indicative of only transmit antenna correlation or only receive antenna correlation. For example, if the receiver is using cross-polarized antennas, then the receiver correlation matrix is an identity matrix. In this manner, the correlation metric ($C_m$) can be computed such that it is indicative of only the transmit antenna correlation.

In addition to computing the value of the antenna correlation metric ($C_m$), the wireless device 46 computes a SINR value for a Type A MIMO detector (step 104A). More specifically, as discussed above, even though the MIMO receiver 66 employs a Type B MIMO detector 70, the SINR value is computed as if, or assuming, that the MIMO receiver 66 had a Type A MIMO detector. The wireless device 46 then computes a SINR value for a Type B MIMO detector (i.e., a SINR value for the Type B MIMO receiver 66) as:

$$\text{SINR}_{TYPE\_B} = \text{SINR}_{TYPE\_A} + \text{offset} \quad (12)$$

where "offset" is an offset value determined based on the value of the antenna correlation metric ($C_m$) (step 106A). In some embodiments, offset values for multiple different values of the antenna correlation metric ($C_m$) are predetermined and stored by the wireless device 46 (e.g., in a LUT). Then, the appropriate offset value to be used to compute the SINR value for the Type B MIMO receiver 66 is selected from the set of predefined offset values based on the value for the antenna correlation metric ($C_m$) computed in step 102C. The predetermined offset values for the different values of the antenna correlation metric ($C_m$) may be predetermined via, e.g., simulation. In other embodiments, the offset value is computed as a predefined function of the antenna correlation metric ($C_m$) such that the offset is computed using the predefined function and the value of the antenna correlation metric ($C_m$) computed in step 102C.

To verify the concept of adjusting the value of the signal quality parameter obtained/computed for the MIMO receiver 66 as if the MIMO receiver 66 has a Type A MIMO detector to obtain the value of the signal quality parameter for the Type B MIMO receiver 66, a number of simulations with different values of transmit antenna correlation were performed.

Figure 8:
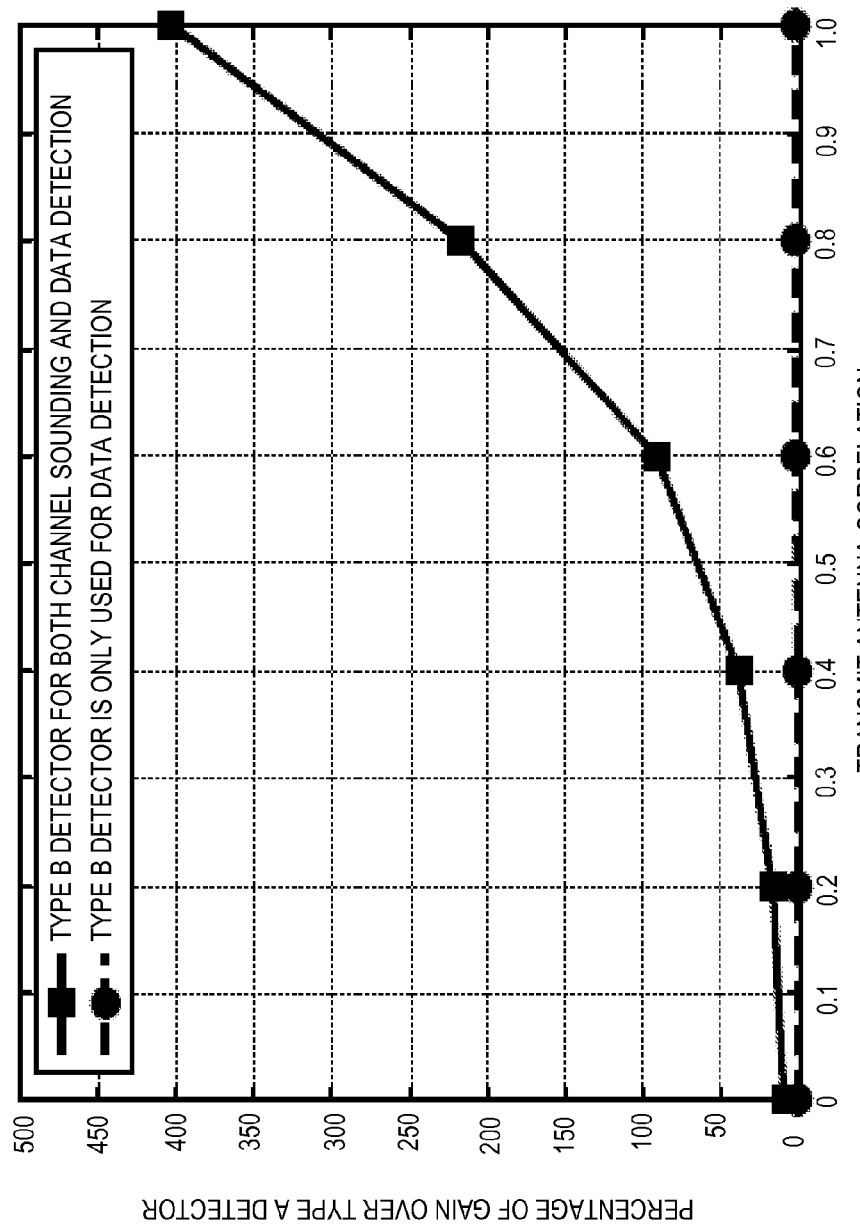
FIGS. 8 and 9 present simulation results that verify the performance improvement provided by embodiments of the present disclosure.
Figure 9:
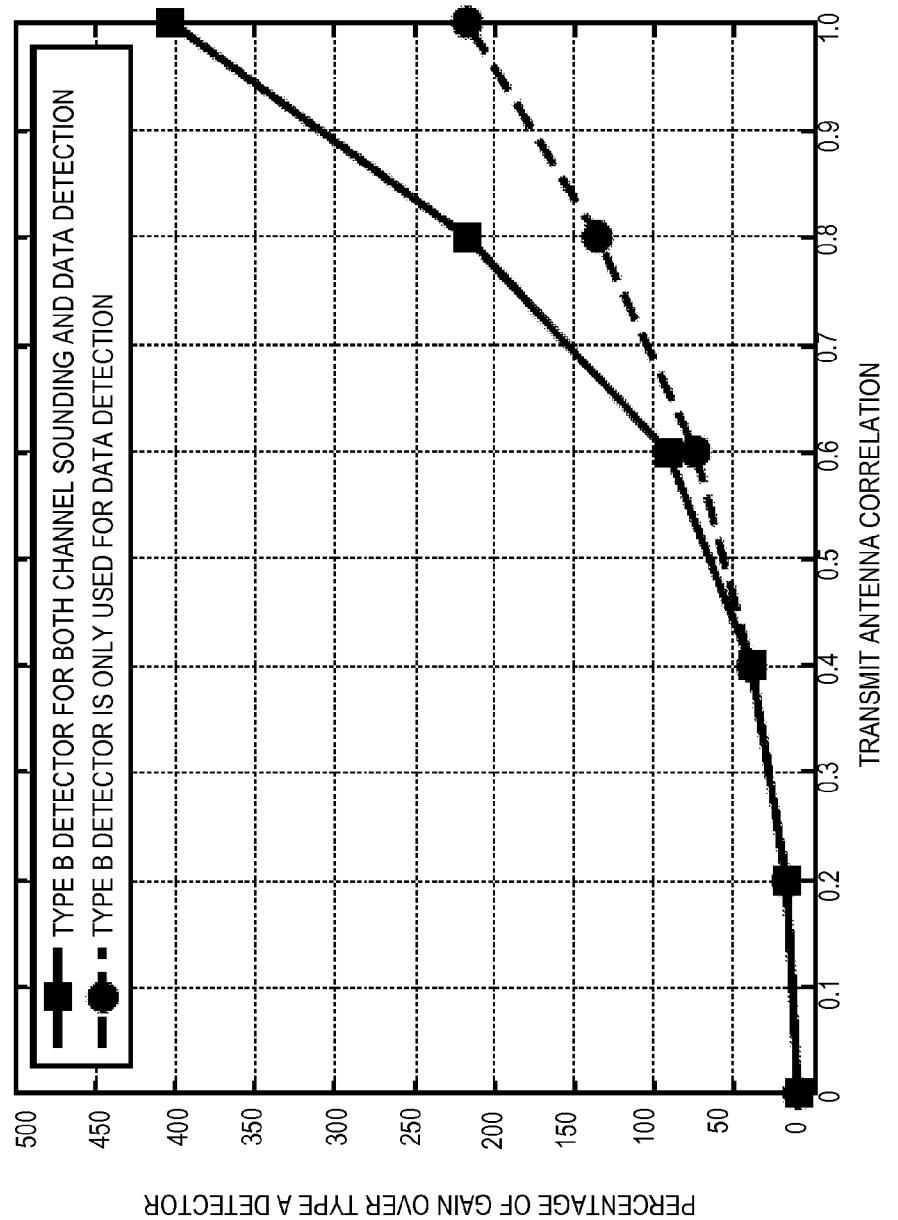

Intuitively, without any modification in the SINR or SNR (i.e., directly using the SINR or SNR value computed as if the MIMO receiver 66 employed a Type A MIMO receiver for feedback generation), the MIMO receiver 66 can be thought of as using a Type A MIMO detector for generating the feedback (e.g., CSI) and a Type B MIMO detector for data detection. The performance of such a MIMO receiver will be equal or slightly better than that of a Type A MIMO receiver (a MIMO receiver where a Type A detector is used for both feedback generation (e.g., CSI) and data detection), as illustrated in FIG. 8. It can be observed that without adjusting the SINR or SNR value for the Type A MIMO detector, gains are not achieved even though the Type B MIMO detector is used for data detection. In contrast, FIG. 9 illustrates the gain achieve when using an offset factor as described above (or otherwise adjusting the SINR or SNR as described above). As illustrated, the performance of the proposed system approaches the theoretical performance when using a Type B MIMO detector for both feedback generation (channel sounding) and data detection.

FIGS. 10 through 14 illustrate processes for determining the offset values for different antenna correlation metric values according to some embodiments of the present disclosure. These offset values can, in some embodiments, be used as the predetermined offset values in, e.g., the process of FIG. 7. Notably, in the description of FIGS. 10 through 14, the signal quality parameter is SINR. Note, however, that the processes are equally applicable to other types of signal quality parameters (e.g., MI and/or efficiency).

Figure 10:
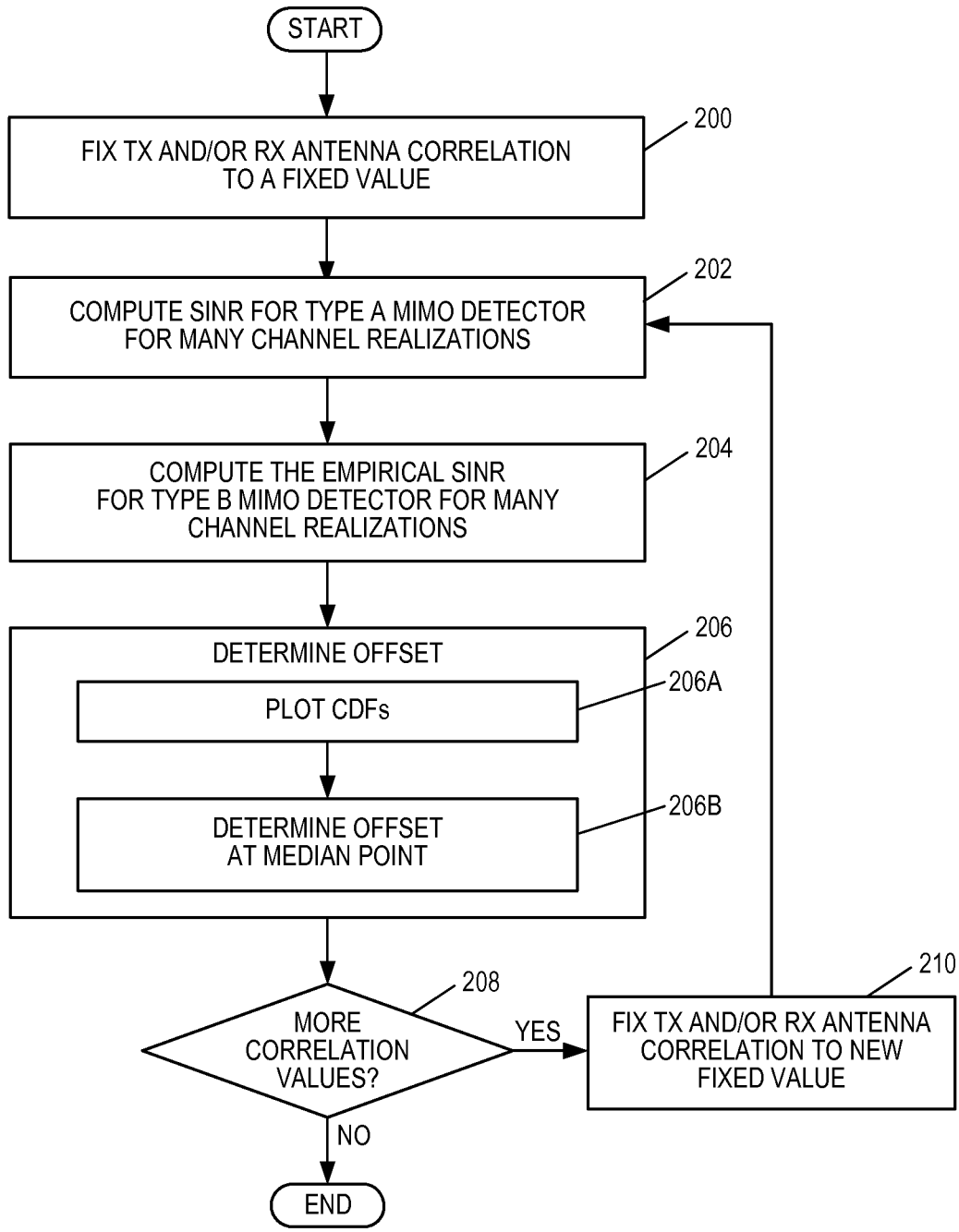
FIG. 10 illustrates a process for computing the offsets for different values of the antenna correlation metric according to some embodiments of the present disclosure.

In particular, FIG. 10 illustrates a process for computing the offsets for different values of the antenna correlation metric according to some embodiments of the present disclosure. Here, the offset values are computed via simulations or in a lab environment. As illustrated, the antenna correlation metric value is set to a first fixed value (step 200). SINR values for a MIMO receiver having a Type A MIMO detector are computed for many different channel realizations (step 202). Each channel realization is a different effective channel matrix H. In addition, empirical SINR values for a MIMO receiver having a Type B MIMO detector are computed for many channel realizations (step 204). The channel realizations used for steps 202 and 204 may or may not be the same channel realizations. The offset value for the fixed antenna correlation metric value is then determined based on the SINR values (step 206). More specifically, in one embodiment, Cumulative Distribution Functions (CDFs) of the SINR values are plotted for the MIMO receiver employing a Type A MIMO detector and the MIMO receiver employing a Type B MIMO detector (step 206A). The offset for the fixed antenna correlation value is then determined to be the offset between the SINR values of the two MIMO detectors at a median point of the CDFs (step 206B). In particular, the median point of the CDFs is chosen as a reference point, and the difference in the SINR values of the two MIMO detectors at this reference point is selected as the offset for the fixed antenna correlation metric value. A determination is then made as to whether offset values are desired for any more antenna correlation metric values (step 208). If so, a new fixed next antenna correlation metric value is selected (step 210), and then the process is repeated. Once there are no more antenna correlation metric values for which an offset value is desired, the process ends.

Figure 11:
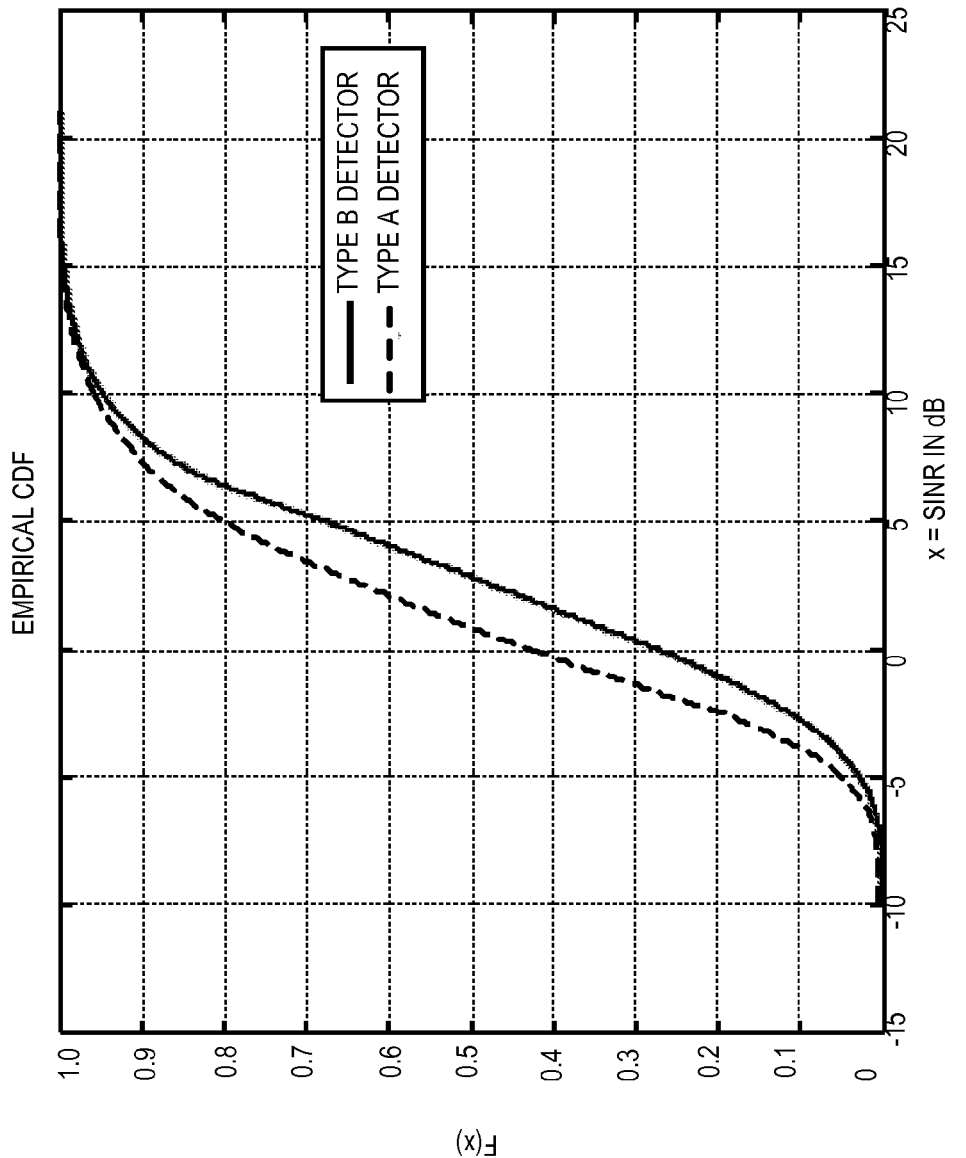
FIG. 11 is a graph of one example of the Cumulative Distribution Functions (CDFs) for Type A and Type B MIMO detectors plotted according to some embodiments of the process of FIG. 10.

FIG. 11 is a graph of one example of the CDFs for Type A and Type B MIMO detectors plotted according to some embodiments of the process of FIG. 10. For this example, the antenna correlation metric value is set to 0.2. As can be seen in FIG. 11, at the median point, the offset between the SINR values for the two MIMO detectors is 2.0 decibels (dB). As such, 2.0 dB is chosen as the offset value for an antenna correlation metric value of 0.2. Using this approach, in one particular example, the offset values were computed as shown in Table 1 below:

TABLE 1

| Transmit Antenna Correlation Metric Value | Offset Value (dB) |
| --- | --- |
| 0.0 | 1.5 |
| 0.2 | 2.0 |
| 0.4 | 3 |
| 0.6 | 4.5 |
| 0.8 | 5.5 |
| 1.0 | 6.0 |

Figure 12:
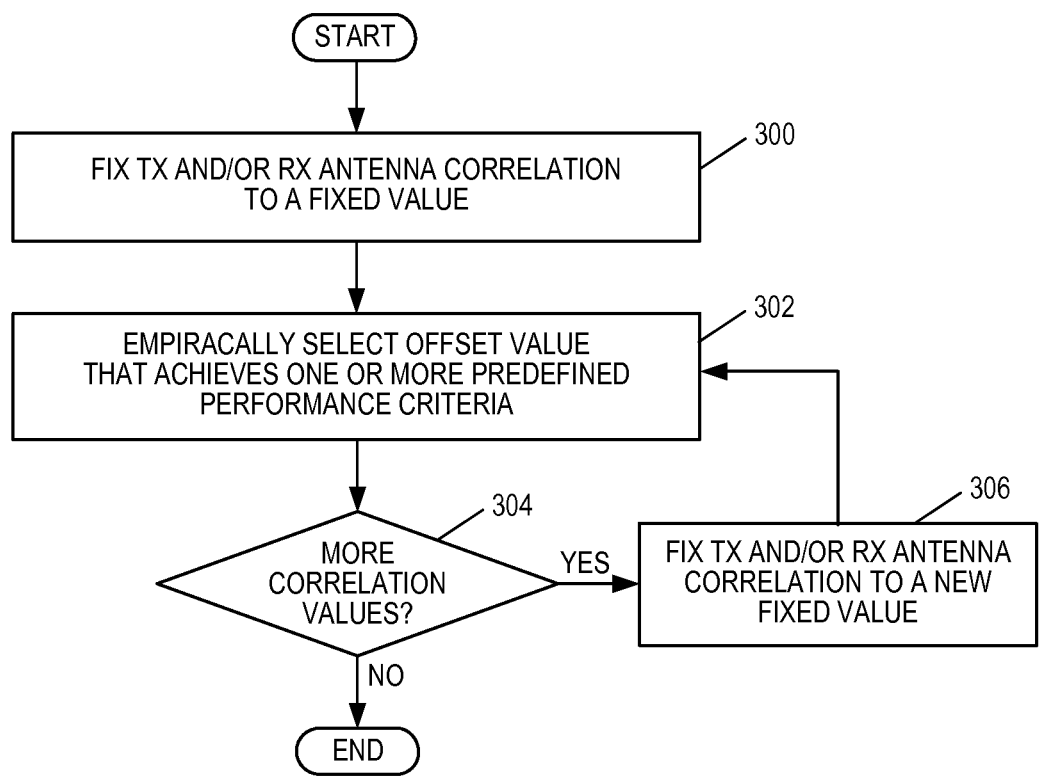
FIG. 12 illustrates a process for computing the offsets for different values of the antenna correlation metric according to some other embodiments of the present disclosure.

FIG. 12 illustrates a process for computing the offsets for different values of the antenna correlation metric according to some other embodiments of the present disclosure. Here, the offset values are computed via simulations or in a lab environment. As illustrated, the antenna correlation metric value is set to a first fixed value (step 300). An offset value that achieves one or more predefined performance criteria is then empirically selected as the offset value for the fixed antenna correlation metric value (step 302). The one or more predefined performance criteria may include, for example, maximum throughput (i.e., select the offset that provides the maximum throughput for the MIMO system) or a desired BLER (e.g., select the offset that provides e.g., a 10% BLER). A determination is then made as to whether offset values are desired for any more antenna correlation metric values (step 304). If so, a new fixed next antenna correlation metric value is selected (step 306), and then the process is repeated. Once there are no more antenna correlation metric values for which an offset value is desired, the process ends.

Figure 13:
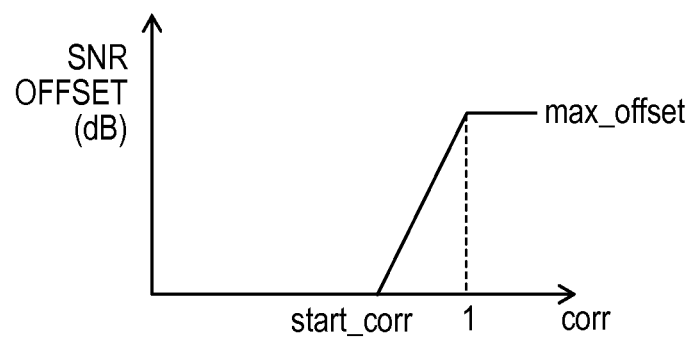
FIG. 13 illustrates one example of a predefined function for computing offset values based on antenna correlation metric values according to some embodiments of the present disclosure.

In some other embodiments, the offset values are computed by the wireless device 46 (i.e., the receiving device) based on a predefined function. The predefined function defines a relationship between antenna correlation metric values and offset values. One example of a predefined function for computing offset values based on antenna correlation metric values is illustrated in FIG. 13. As illustrated, for antenna correlation metric values above a predefined value start_corr, the offset value increases linearly as a function of the antenna correlation metric value up to a maximum value or max_offset (dB). Note that the illustration of FIG. 13 is only an example.

Figure 14:
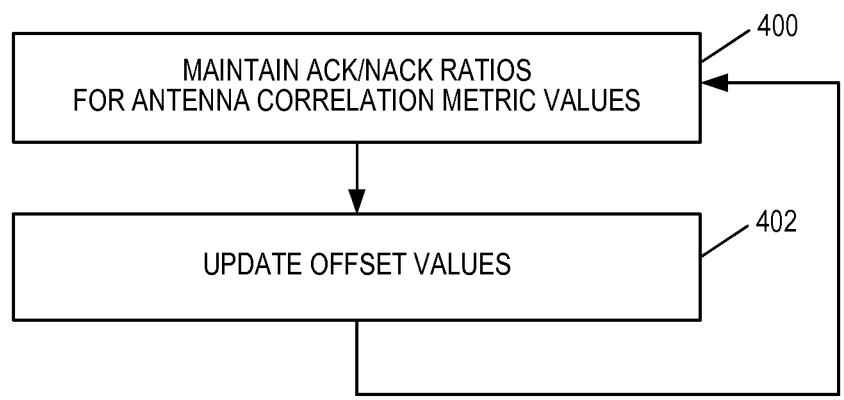
FIG. 14 illustrates a process by which the offset values are dynamically updated according to some embodiments of the present disclosure.

In FIGS. 10 through 13 the offset values are predetermined, e.g., via simulations or in a lab environment. FIG. 14 illustrates an embodiment in which the offset values are computed dynamically by, e.g., the wireless device 46 (i.e., the receiving device). This process could be performed by an outer loop controller having a relatively large time constant so that changes in the offset values occur slowly in order to not interfere, e.g., with an outer loop of the base station 44 since the base station 44 will typically assume that the wireless device 46 has constant behavior. As illustrated, the wireless device 46 maintains an Acknowledgement/Negative Acknowledgment (ACK/NACK) ratio for each of a number of different antenna correlation metric values (step 400). For each antenna correlation metric value, the corresponding ACK/NACK ratio is the ratio of ACKs to NACKs transmitted by the wireless device 46 to the base station 44 when the antenna correlation for the MIMO channel corresponds to the antenna correlation metric value. The wireless device 46 updates the offset values based on the corresponding ACK/NACK ratios (step 402). For example, if the ACK/NACK ratio for a particular antenna correlation metric value is less than a predefined threshold, then the offset may be increased by some predefined amount. More specifically, the ACK/NACK ratio is tracked dynamically. For example, for each ACK, the offset is increased by a predefined value X; and, for each NACK, the offset is decreased by a predefined value 9X. Then, for a 10% BLER, the average increase of the offset is 0.1*(−9X)+0.9X=0 (i.e., there is a steady state solution for the offset). Note that the ACK/NACK ratio is only one example parameter that may be used to dynamically update the offset values. Other non-limiting examples are an effective SNR after demodulation, the number of turbo iterations that are needed before Cyclic Redundancy Check (CRC) check, or the like. The process of FIG. 14 is repeated such that the offset values are dynamically updated over time.

The following acronyms are used throughout this disclosure.

3GPP $3^{rd}$ Generation Partnership Project
ACK Acknowledgement
ASIC Application Specific Integrated Circuit
BLER Block Error Rate
CDF Cumulative Distribution Function
CDMA Code Division Multiple Access
CPU Central Processing Unit
CQI Channel Quality Indicator
CRC Cyclic Redundancy Check
CSI Channel State Information
dB Decibel
eNB Enhanced or Evolved Node B
FFT Fast Fourier Transform
FIR Finite Impulse Response
FPGA Field Programmable Gate Array
IFFT Inverse Fast Fourier Transform
IIR Infinite Impulse Response
HSDPA High Speed Downlink Packet Access
LTE Long Term Evolution
LTE-A Long Term Evolution-Advanced
LUT Look-Up Table
MAP Maximum A Posteriori Probability
MI Mutual Information
MIMO Multiple-Input-Multiple-Output
ML Maximum Likelihood
MMSE Minimum Mean Square Error
NACK Negative Acknowledgement
OFDM Orthogonal Frequency Division Multiplexing
OFDMA Orthogonal Frequency Division Multiple Access
PMI Precoding Matrix Indicator
RI Rank Information
RX Receiver
SIC Successive Interference Cancellation
SINR Signal-to-Interference-plus-Noise Ratio
SNR Signal-to-Noise Ratio
TX Transmitter
UE User Equipment
ZF Zero-Forcing Those skilled in the art will recognize improvements and modifications to the embodiments of the present disclosure. All such improvements and modifications are considered within the scope of the concepts disclosed herein and the claims that follow.

What is claimed is:

1. A method of operation of a receiving device in a Multiple-Input-Multiple-Output, MIMO, system to provide feedback to a transmitting device in the MIMO system for adaptive transmission from the transmitting device to the receiving device in the MIMO system, comprising:

determining an antenna correlation metric value indicative of at least one of a group consisting of: transmit antenna correlation for a MIMO channel from the transmitting device to the receiving device and receive antenna correlation for the MIMO channel;

obtaining a first value for a signal quality parameter for a MIMO receiver of the receiving device as if the MIMO receiver uses a first MIMO detector of a first MIMO detector type;

computing a second value for the signal quality parameter for the MIMO receiver of the receiving device for a second MIMO detector of a second MIMO detector type actually used by the MIMO receiver based on the first value for the signal quality parameter for the first MIMO detector of the first MIMO detector type and the antenna correlation metric value;

generating feedback based on the second value for the signal quality parameter for the second MIMO detector of the second MIMO detector type; and providing the feedback to the transmitting device.

2. The method of claim 1 wherein the first MIMO detector type is a filter MIMO detector type, and the second MIMO detector type is a list MIMO detector type.

3. The method of claim 2 wherein:
the first MIMO detector is one of a group consisting of: a Zero-Forcing, ZF, MIMO detector; a Minimum Mean Square Error, MMSE, MIMO detector; a decision feedback MIMO detector; a nulling-cancelling MIMO detector; and a MIMO detector based on Successive Interference Cancellation, SIC; and
the second MIMO detector is one of a group consisting of: a Maximum Likelihood, ML, MIMO detector; a Maximum A Posteriori Probability, MAP, MIMO detector; a sphere decoding MIMO detector; a list sphere decoding MIMO detector; a reduced list size ML MIMO detector, and a reduced list size MAP MIMO detector.

4. The method of claim 2 wherein the first MIMO detector is a Minimum Mean Square Error, MMSE, MIMO detector, and the second MIMO detector is a Maximum Likelihood, ML, MIMO detector.

5. The method of claim 1 further comprising:
receiving one or more downlink parameter values from the transmitting device in response to providing the feedback to the transmitting device; and
receiving downlink data transmitted from the transmitting device to the receiving device via the second MIMO detector of the second MIMO detector type using the one or more downlink parameter values.

6. The method of claim 1 wherein the signal quality parameter is one of a group consisting of: Signal-to-Interference-plus-Noise Ratio, SINR, and Signal-to-Noise Ratio, SNR.

7. The method of claim 1 wherein the feedback comprises at least one of a group consisting of: a Channel Quality Indictor, CQI; a Precoding Matrix Indicator, PMI; and a transmission rank.

8. The method of claim 1 wherein determining the antenna correlation metric value comprises:
estimating a MIMO channel from the transmitting device to the receiving device to thereby provide a channel estimate;
computing a correlation matrix for the MIMO channel from the channel estimate; and
computing the antenna correlation metric value based on the correlation matrix.

9. The method of claim 8 wherein:
obtaining the first value for the signal quality parameter for the MIMO receiver of the receiving device as if the MIMO receiver uses the first MIMO detector of the first MIMO detector type comprises computing a Signal-to-Interference-plus-Noise Ratio, SINR, or Signal-to-Noise Ratio, SNR, value as if the MIMO receiver of the receiving device uses the first MIMO detector of the first MIMO detector type; and computing the second value for the signal quality parameter for the MIMO receiver of the receiving device for the second MIMO detector of the second MIMO detector type actually used by the MIMO receiver comprises computing a SINR or SNR value for the MIMO receiver for the second MIMO detector of the second MIMO detector type actually used by the MIMO receiver as a sum of the SINR or SNR value obtained for the MIMO receiver as if the MIMO receiver uses the first MIMO detector of the first MIMO detector type and an offset value corresponding to the antenna correlation metric value.

10. The method of claim 9 wherein the offset value is a predetermined offset value for the antenna correlation metric value.

11. The method of claim 10 wherein there are a plurality of predetermined offset values for a plurality of antenna correlation metric values, respectively, and the predetermined offset value for the antenna correlation metric value is the one of the plurality of predetermined offset values that corresponds to the antenna correlation metric value.

12. The method of claim 9 wherein the offset value is a predefined function of the antenna correlation metric value.

13. The method of claim 9 wherein the offset value is dynamically updated by the receiving device.

14. A receiving device in a Multiple-Input-Multiple-Output, MIMO, system enabled to provide feedback to a transmitting device in the MIMO system, comprising:
 a transmitter;
 a MIMO receiver; and
 circuitry configured to:
  determine an antenna correlation metric indicative of at least one of a group consisting of: transmit antenna correlation for a MIMO channel from the transmitting device to the receiving device and receive antenna correlation for the MIMO channel;
  obtain a first value for a signal quality parameter for the MIMO receiver as if the MIMO receiver uses a first MIMO detector of a first MIMO detector type;
  compute a second value for the signal quality parameter for the MIMO receiver for a second MIMO detector of a second MIMO detector type actually used by the MIMO receiver based on the first value for the signal quality parameter for the first MIMO detector of the first MIMO detector type and the antenna correlation metric value;
  generate feedback based on the second value for the signal quality parameter for the second MIMO detector of the second MIMO detector type; and
  provide the feedback to the transmitting device via the transmitter.

15. The receiving device of claim 14 wherein the first MIMO detector type is a filter MIMO detector type, and the second MIMO detector type is a list MIMO detector type.

16. The receiving device of claim 15 wherein:
 the first MIMO detector is one of a group consisting of: a Zero-Forcing, ZF, MIMO detector; a Minimum Mean Square Error, MMSE, MIMO detector; a decision feedback MIMO detector; a nulling-cancelling MIMO detector; and a MIMO detector based on Successive Interference Cancellation, SIC; and
 the second MIMO detector is one of a group consisting of: a Maximum Likelihood, ML, MIMO detector; a Maximum A Posteriori Probability, MAP, MIMO detector; a sphere decoding MIMO detector; a list sphere decoding MIMO detector; a reduced list size ML MIMO detector, and a reduced list size MAP MIMO detector.

17. The receiving device of claim 15 wherein the first MIMO detector is a Minimum Mean Square Error, MMSE, MIMO detector, and the second MIMO detector is a Maximum Likelihood, ML, MIMO detector.

18. The receiving device of claim 14 wherein the circuitry is further configured to:
 receive, via the MIMO receiver, one or more downlink parameter values from the transmitting device in response to providing the feedback to the transmitting device; and
 the MIMO receiver is further configured to receive downlink data transmitted from the transmitting device to the receiving device via the second MIMO detector of the second MIMO detector type using the one or more downlink parameter values.

19. The receiving device of claim 14 wherein the signal quality parameter is one of a group consisting of: Signal-to-Interference-plus-Noise Ratio, SINR, and Signal-to-Noise Ratio, SNR.

20. The receiving device of claim 14 wherein the feedback comprises at least one of a group consisting of: a Channel Quality Indictor, CQI; a Precoding Matrix Indicator, PMI; and a transmission rank.

21. The receiving device of claim 14 wherein, in order to determine the antenna correlation metric value, the circuitry is further configured to:
 estimate a MIMO channel from the transmitting device to the receiving device to thereby provide a channel estimate;
 compute a correlation matrix for the MIMO channel from the channel estimate; and
 compute the antenna correlation metric value based on the correlation matrix.

22. The receiving device of claim 21 wherein:
 the signal quality parameter is Signal-to-Interference-plus-Noise Ratio, SINR, or Signal-to-Noise Ratio, SNR, such that the first value is a first SINR or SNR value and the second value is a second SINR or SNR value; and
 in order to compute the second value for the signal quality parameter for the MIMO receiver for the second MIMO detector of the second MIMO detector type actually used by the MIMO receiver, the circuitry is further configured to compute the second SINR or SNR value for the MIMO receiver for the second MIMO detector of the second MIMO detector type as a sum of the SINR or SNR value for the MIMO receiver as if the MIMO receiver uses the first MIMO detector of the first MIMO detector type and an offset value corresponding to the antenna correlation metric value.

23. The receiving device of claim 22 wherein the offset value is a predetermined offset value for the antenna correlation metric value.

24. The receiving device of claim 23 wherein there are a plurality of predetermined offset values for a plurality of antenna correlation metric values, respectively, and the predetermined offset value for the antenna correlation metric value is the one of the plurality of predetermined offset values that corresponds to the antenna correlation metric value.

25. The receiving device of claim 22 wherein the offset value is a predefined function of the antenna correlation metric value.

26. The receiving device of claim 22 wherein the offset value is dynamically updated by the receiving device.

* * * * *